Nov. 29, 1966  F. T. NEWELL ET AL  3,288,495

INSULATED COMPRESSION COUPLING

Filed April 24, 1963

INVENTORS.
FREDERICK T. NEWELL
BY HENRY SLIVINSKI

ATTORNEY.

United States Patent Office

3,288,495
Patented Nov. 29, 1966

3,288,495
INSULATED COMPRESSION COUPLING
Frederick T. Newell and Henry Slivinski, Bradford, Pa., assignors to Dresser Industries, Inc., Dallas, Tex., a corporation of Delaware
Filed Apr. 24, 1963, Ser. No. 275,265
4 Claims. (Cl. 285—53)

The present invention relates to compression couplings and is concerned primarily with a coupling which will insure complete electric insulation between the two pipes that are joined by the coupling.

A compression coupling of the type with which this invention is concerned includes as characteristic and essential elements a middle ring or sleeve having flared ends which cooperate with the pipe in defining gasket recesses. Gaskets are positioned about the pipes and each gasket has a portion received in one of the gasket recesses. Followers are disposed over and about the gaskets and are drawn together by bolts to compress the gaskets.

Heretofore attempt has been made to provide a compression coupling of the type aforesaid which has the feature of electric insulation incorporated thereinto. One arrangement which has met with some usage is to apply a cap of insulating material over a pipe end. However, it has been found that should one of the pipes be inserted too far into the middle ring the pipe may come into engagement with a portion of the middle ring and impair the insulation.

While some compression couplings have a central abutment or pipe stop, a coupling of the type with which this invention is concerned includes a middle ring that is bellied between the gasket recesses and does not include a central abutment.

With the foregoing conditions in mind the present invention has in view as its foremost objective the provision of a compression coupling of the character indicated which includes a sleeve of insulating material having a uniform bore and an extent substantially coextensive with that portion of the middle ring between the gasket recesses. This sleeve of insulating material in no way interferes with the insertion of a pipe from either end yet its extent insures that the pipe coming in from the insulating side will not come into conductive engagement with the middle ring.

In providing an insulating coupling it is sufficient that one pipe be completely insulated from the coupling and the other pipe. It makes no difference if one of the pipes is in conductive engagement with the middle ring or other coupling part so long as one of them is not.

With this factor in mind, a further object of the invention is to provide a compression coupling of the character aforesaid having a middle ring with an annular cylindrical surface immediately adjacent each flared end. These annular surfaces are of different diameters. One of them is comparatively smaller and has a diameter that just permits insertion of the pipe end with mechanical clearance. The other end has another diameter sufficient to accommodate the insulating sleeve. With this arrangement the insulating sleeve may be inserted into the coupling from the side of the larger diameter and the insertion continued until the sleeve abuts the shoulder defining the annular surface of the smaller diameter. This facilitates and insures accurate positioning of the insulating sleeve.

A further object of the invention is to provide in an insulating compression coupling of the type noted an insulating sleeve of polypropylene. This material is sufficiently strong and tough to withstand the conditions of service usage.

Various other more detailed advantages of the invention such as arise with carrying out of the above noted idea in a practical embodiment and in part become apparent and in part have hereinafter stated as the description of the invention proceeds.

The invention therefore comprises a compression coupling having a bellied middle ring presenting an annular surface adjacent to each flared end with said annular surfaces being of different diameters and a cylindrical sleeve of insulating material having a uniform bore and one end abutting the shoulder defining the annular surface of small diameter.

For a full and more complete understanding of the invention reference may be had to the following description and accompanying drawings wherein.

Figure 1:
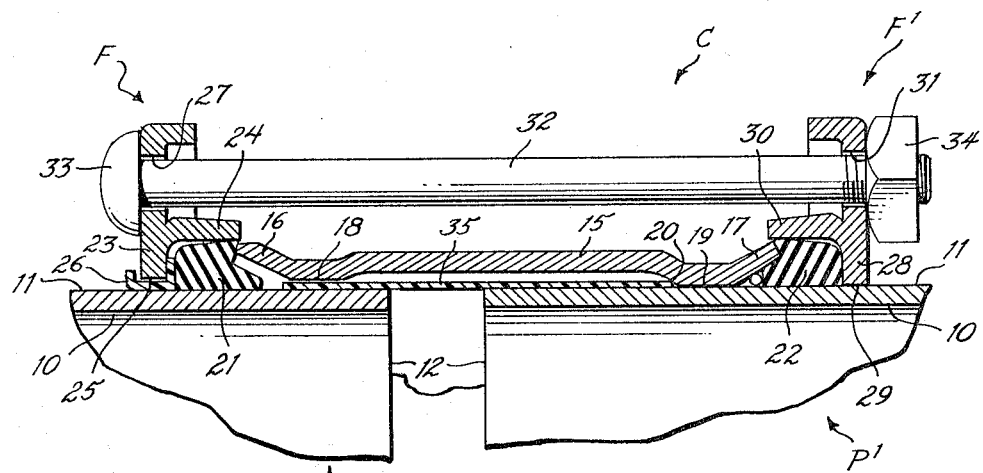
FIGURE 1 is a sectional view depicting the insulating compression coupling of this invention applied to a pair of meeting pipe ends.

Referring now to the drawings and first more particularly to FIGURE 1, a pair of pipe ends to be coupled are designated P and P'. Each of the pipes P and P' has a bore 10, an outer surface 11, and an end face 12.

A coupling is referred to in its entirety by the reference character C. The coupling C includes a bellied middle ring 15. The middle ring 15 has flared ends as indicated at 16 and 17. Adjacent to the flared end 16 there is a cylindrical surface 18, and a second annular cylindrical surface 19 is adjacent to the flared end 17. This annular surface 19 is defined by the flare 17 on the outer side and a shoulder 20 on the inner side. The middle ring 15 is bellied between the surfaces 18 and 19.

A gasket 21 of rubber or a comparable elastomer material is positioned about the pipe P and has a portion entering the gasket recess defined by the pipe P and flared end 16. A second gasket 22 of similar material is positioned about the pipe P' and has a portion receiving in the recess defined by the flare 17 and pipe P'.

A follower referred to in its entirety by the reference character F is positioned about the pipe P. The follower includes an end wall 23 and an inwardly extending flange 24 which overlies the gasket 21. The end wall 23 has a pipe receiving opening 25 and in this opening carries an insulating ring 26 which may be of any good insulating material such as polypropylene. The follower F also has a plurality of bolt holes 27.

A second follower F' is positioned about the pipe P' and has an end wall 28 provided with a pipe receiving opening 29 which receives the pipe P'. The follower F' also has an inwardly extending flange 30 which overlies the gasket 22. It also has a plurality of bolt holes 31.

The bolt holes 27 on the follower F align with the bolt holes 31 in the follower F'. A plurality of bolts 32 pass through each pair of aligned bolt holes. Each of the bolts 32 have a head 33 at one end and a nut 34 at the other. Obviously the nuts 34 may be tightened to draw the follower F and F' together and thus compress the gaskets 21 and 22 about the pipes P and P'.

Figure 2:
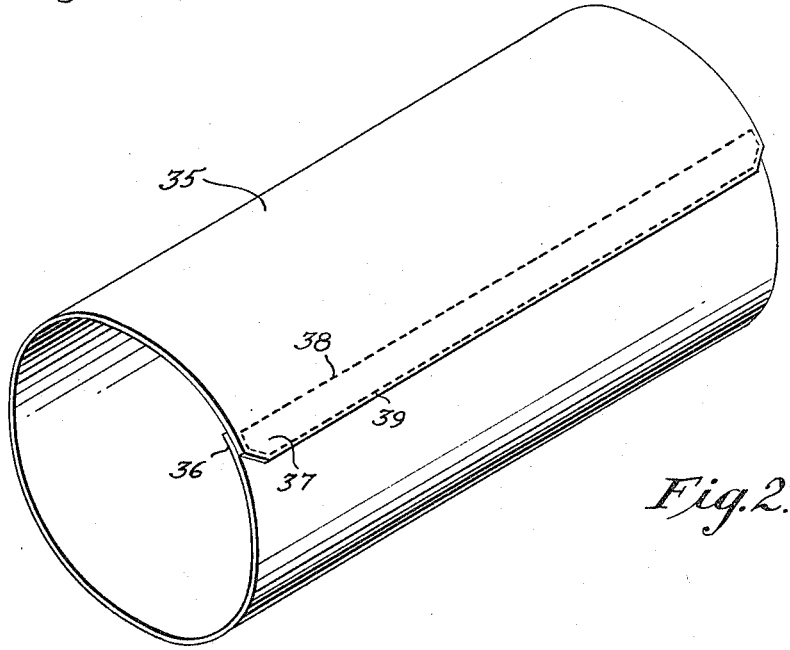
FIGURE 2 is a perspective view of the insulating sleeve per se.

Referring now more particularly to FIGURE 2, a tubular insulating sleeve 35 is therein illustrated. While the sleeve 35 may be made from any appropriate material having good insulating properties, the invention has particularly in mind the use of a plastic that will withstand the condition of service usage. Polypropylene is a good example of such a material.

While a sleeve 35 might be formed as a seamless sleeve by appropriate extrusion processes, the invention contemplates forming it from flat sheet material. Thus, it is rolled into the cylindrical formation illustrated providing overlapping ends 36 and 37. These overlapping ends are double stitched with nylon threads along the lines 38 and 39.

The insulating sleeve 35 has an outside diameter greater than that of the annular surface 19 but less than that of the annular surface 18. Thus, the insulating sleeve 35 is readily assembled within the middle ring by inserting it through the opening defined by the annular surface 18 and continuing the insertion until one end of the sleeve abuts the shoulder 20. This facilitates positioning of the insulating sleeve within the middle ring in a position in which it is substantially coextensive with the bellied portion of the middle ring.

It is evident that when a pipe P is inserted through the pipe receiving opening in the follower F and the insertion continued until it enters the insulating sleeve 35, definite assurance is had that the pipe will be wholly insulated from all parts of the coupling C and the other pipe P'. This holds true regardless of the degree or extent of insertion. It obviates the necessity of inserting one or both of the pipes in an exact predetermined distance. The only requirement is that the ends of the pipes, P and P', be in spaced relation.

While preferred a specific embodiment of the invention is hereinbefore set forth it is to be clearly understood that the invention is not to be limited to the exact constructions, mechanisms, and devices illustrated and described, because various modifications of these details may be provided in putting the invention into practice within the purview of the appended claims.

What is claimed is:

1. A compression pipe coupling comprising a middle ring having a central portion and flared ends providing annular gasket recesses; a gasket within each of said recesses; a pair of followers engaging said gaskets at their exposed outer ends; means for drawing said followers together; a straight tubular insulating sleeve within said middle ring, said central portion having a first portion of minimum inside diameter adjacent one of said flared ends and being approximately the same diameter as the inside diameter of said sleeve and providing a shoulder abutting the end of the insulating sleeve, and the remaining portion of said central portion extending from said shoulder back to the extreme other end having an inside diameter greater than the outside diameter of the sleeve, said sleeve extending from said shoulder through said central portion at least to the point of juncture of said central portion and the other of said flared portions to thereby insulate said middle ring from a pipe end received in said other end portion, and means for insulating said pipe end from the follower at said other end of the middle ring.

2. A coupling according to claim 1, wherein said sleeve is formed of polypropylene.

3. A compression coupling comprising a middle ring having a bellied portion and flared ends defining gasket recesses tapered inwardly to two middle ring portions of smaller inside diameter than said bellied portion; a gasket within each of said recesses; a pair of followers engaging said gaskets at their exposed outer ends; means for drawing said followers together; and a straight tubular insulating sleeve within said middle ring spanning the distance between said spaced middle ring portions of minimum inside diameter; one of said portions having an inside diameter slightly less than the other and providing a shoulder abutting the adjacent end of the sleeve, the other of said middle ring portions having an inside diameter greater than the outside diameter of said insulating sleeve, said sleeve extending from said shoulder through the middle ring including said other portion of smaller diameter at the other end and completely insulating the middle ring from a pipe section inserted from said other end of the coupling, and means for insulating said pipe section from the follower at said other end of the coupling.

4. A coupling according to claim 3, wherein said sleeve is a polypropylene sheet material formed into a tube and stitched along the overlapping edges.

References Cited by the Examiner

UNITED STATES PATENTS

| 1,921,400 | 8/1933 | Weber | 285—337 |
| 1,986,357 | 1/1935 | Perry | 285—53 |
| 2,269,695 | 1/1942 | Scharf | 285—53 |
| 2,595,408 | 5/1952 | Quest | 138—128 |
| 2,959,692 | 11/1960 | Marx | 285—48 |

FOREIGN PATENTS 427,650  6/1911  France.

CARL W. TOMLIN, *Primary Examiner.*

R. GIANGIORGI, *Assistant Examiner.*